United States Patent [19]

Naaktgeboren

[11] Patent Number: 4,525,991
[45] Date of Patent: Jul. 2, 1985

[54] BALER FEEDER MECHANISM

[75] Inventor: Adrianus Naaktgeboren, Veldegem, Belgium

[73] Assignee: Sperry Corporation, New Holland, Pa.

[21] Appl. No.: 569,438

[22] Filed: Jan. 9, 1984

[51] Int. Cl.³ .................. A01D 89/00; A01D 59/02
[52] U.S. Cl. ...................................... 56/341; 56/364; 100/189
[58] Field of Search ............... 56/341, 364, 343, 344; 100/142, 189

[56] References Cited

U.S. PATENT DOCUMENTS

| 2,917,993 | 12/1959 | Nikkel | 100/142 |
| 4,034,543 | 7/1977 | Voth et al. | 56/341 |
| 4,171,606 | 10/1979 | Ziegler et al. | 56/364 |
| 4,375,786 | 3/1983 | Oosterling et al. | 100/189 |
| 4,403,544 | 9/1983 | Naatgeboren | 100/189 |

FOREIGN PATENT DOCUMENTS

| 264893 | 9/1968 | Austria | 56/344 |
| 849028 | 7/1949 | Fed. Rep. of Germany | 56/341 |
| 2800353 | 8/1979 | Fed. Rep. of Germany | 56/344 |
| 1130761 | 10/1968 | United Kingdom . | |

Primary Examiner—Gene Mancene
Assistant Examiner—John G. Weiss
Attorney, Agent, or Firm—Darrell F. Marquette; Frank A. Seemar; Larry W. Miller

[57] ABSTRACT

In a baler having a duct communicating at one end with an inlet opening formed in a bale case, a feeder mechanism is provided to pack crop material into the duct and to stuff crop material from the duct into the bale case via the inlet opening. The feeder mechanism includes a first set of feeder elements arranged so that their outer ends follow a first path of movement and a second set of feeder elements arranged so that their outer ends follow a second path of movement. The first and second paths of movement are generally apple-shaped and are offset relative to each other.

13 Claims, 11 Drawing Figures

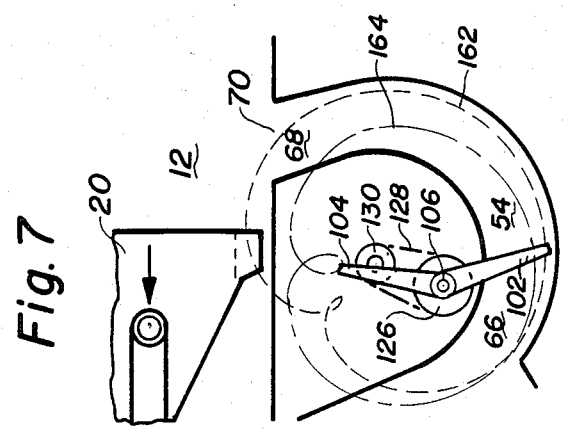
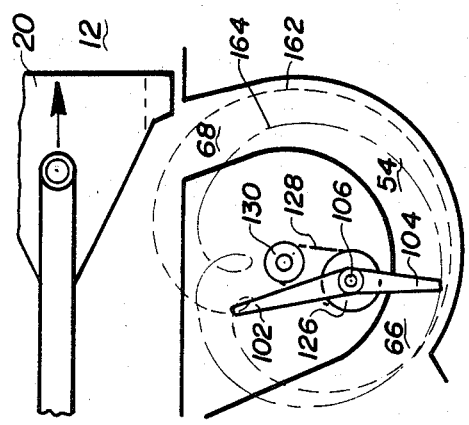
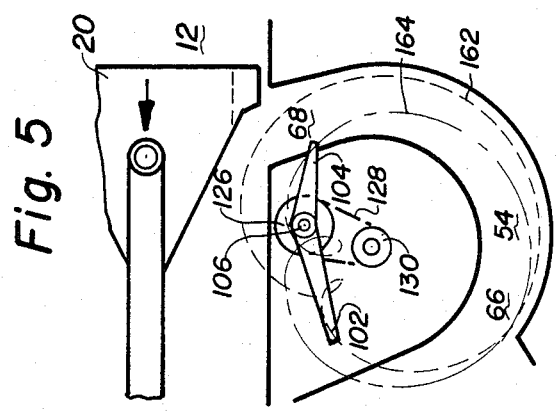
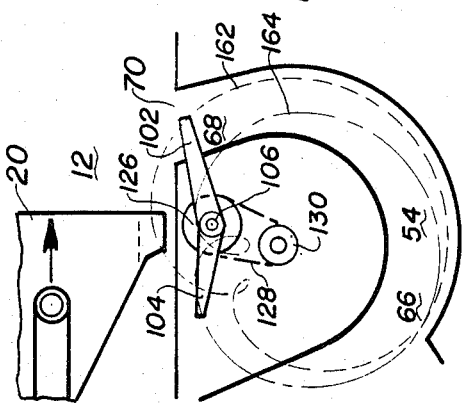

BALER FEEDER MECHANISM

BACKGROUND OF THE INVENTION

This invention relates generally to agricultural balers and, in particular, to feeder mechanisms for such balers.

In a conventional type of baler that includes a duct communicating at one end with an inlet opening in a bale case, one feeder mechanism is provided for packing crop material into the duct and another feeder mechanism is provided for stuffing crop material from the duct into the bale case via the inlet opening. U.S. Pat. No. 4,034,543 discloses a baler of this type in which the feeder mechanism for packing is comprised of a plurality of fingers that extend from and retract into a rotatable drum, and the feeder mechanism for stuffing is comprised of a series of tines that oscillate in a kidney-shaped path of travel. Another baler of this type is disclosed in U.S. Pat. No. 4,372,104 where the feeder mechanism for packing includes a plurality of prongs that move in an elliptical path of travel, and the feeder mechanism for stuffing includes a series of plates mounted on a rotatable tube. U.S. Pat. No. 4,375,786 discloses a further baler of this type where the feeder mechanism for packing is formed by pushing members mounted on a rotatable disc, and the feeder mechanism for stuffing is formed by a rotatable flap member.

SUMMARY OF THE INVENTION

The present invention provides a baler that includes a bale case having an inlet opening formed therein, and a duct communicating at one end with the inlet opening in the bale case. Feed means are provided including a first set of feeder elements arranged to pack crop material into the duct and a second set of feeder elements arranged to stuff crop material from the duct into the base case through the inlet opening. The first and second sets of feeder elements are each rotatable in one direction about one axis and in the opposite direction about another axis which is offset relative to the first-mentioned axis. The feeder elements of the first set have outer ends following a first path of movement, and the feeder elements of the second set have outer ends following a second path of movement. The first and second paths of movement are offset relative to each other. Only the second path of movement passes through the base case. In the preferred embodiment, the feeder elements of the second set are longer than the feeder elements of the first set, the first and second paths of movement are generally apple-shaped, and the first and second sets of feeder elements are arranged so that there is an obtuse angle therebetween.

DESCRIPTION OF THE DRAWINGS

FIGS. 4–11 are somewhat schematic views taken at various stages during the operation of the baler of FIG. 1.

DESCRIPTION OF THE PREFERRED EMBODIMENT

Figure 1:
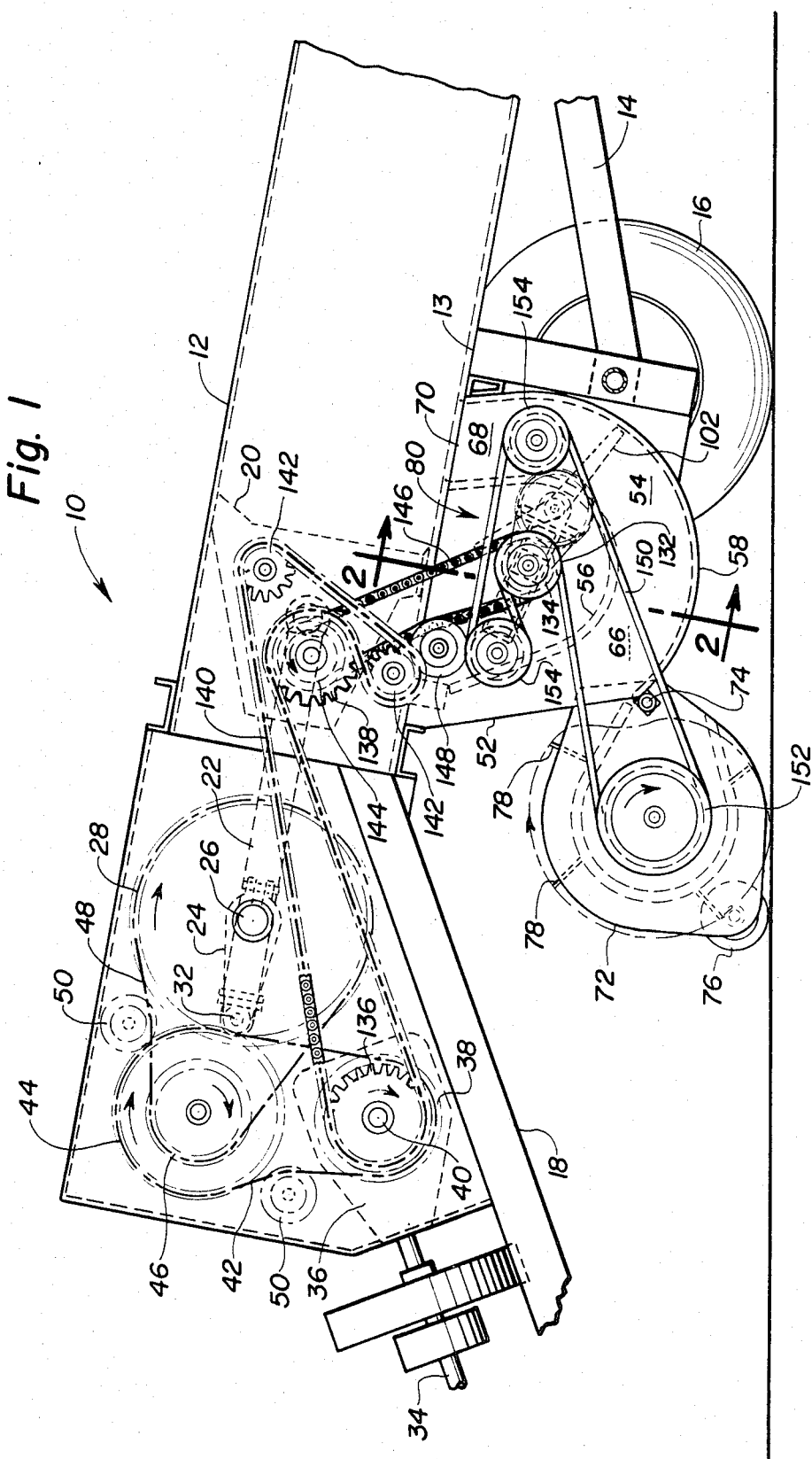
FIG. 1 is a side elevational view of a baler embodying the preferred embodiment of the feed means of the present invention.
Figure 3:
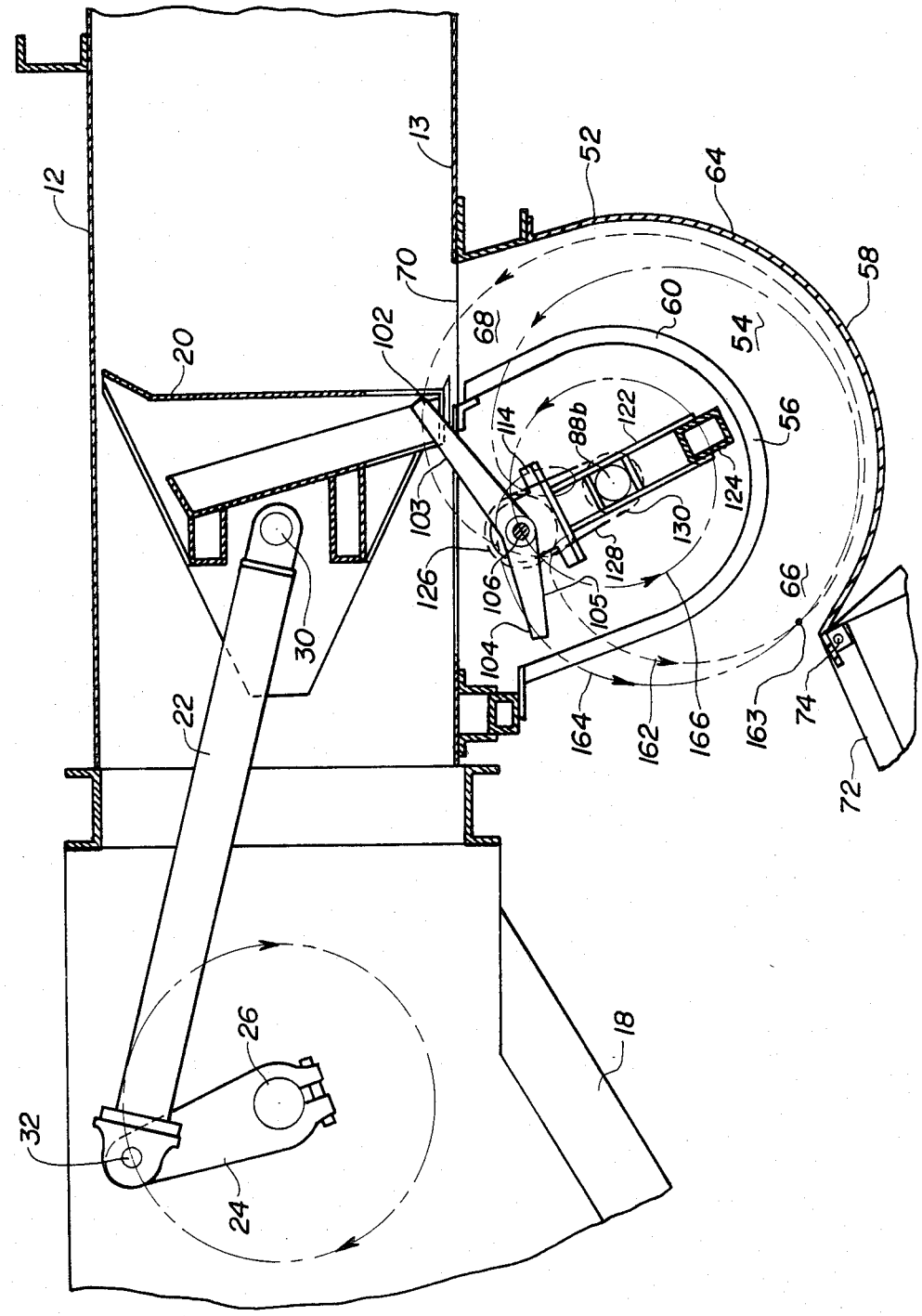
FIG. 3 is a sectional view taken along lines 3—3 in FIG. 2.

Referring to FIG. 1, a baler 10 includes a bale case 12 mounted on a frame 14 which is supported by wheels 16. A tongue 18 extends forwardly from the bale case 12 for attachment to a tractor (not shown). A plunger 20 is reciprocably disposed in the bale case 12 to form crop material into rectangular bales. The plunger 20 is attached by a connecting rod 22 to a crank arm 24 fixed to a shaft 26 on which a sprocket 28 is fixedly mounted. As best shown in FIG. 3, the connecting rod 22 has a pivotal connection 30 at one end with the plunger 20 and another pivotal connection 32 at the other end with the crank arm 24.

A drive shaft 34 is connected at one end to a gearbox 36 carried on the baler 10 and is adapted for connection at the other end to the PTO of a tractor (not shown). The drive shaft 34 causes clockwise rotation, as viewed in FIG. 1, of a sprocket 38 which is fixed to the output shaft 40 of the gearbox 36. The sprocket 38 is connected via a chain 42 to a sprocket 44 of larger diameter. A sprocket 46 is fixed to rotate with the sprocket 44. This arrangement of sprockets provides a speed reduction from the sprocket 38 to the sprocket 46. A chain 48 connects the sprocket 46 to the sprocket 28 to cause clockwise rotation of the sprocket 28, as viewed in FIG. 1 in order to cause reciprocation of the plunger 20 in a fore-and-aft direction in the bale case 12. Idlers 50 are provided to maintain proper tension in the chains 42 and 48.

Figure 2:
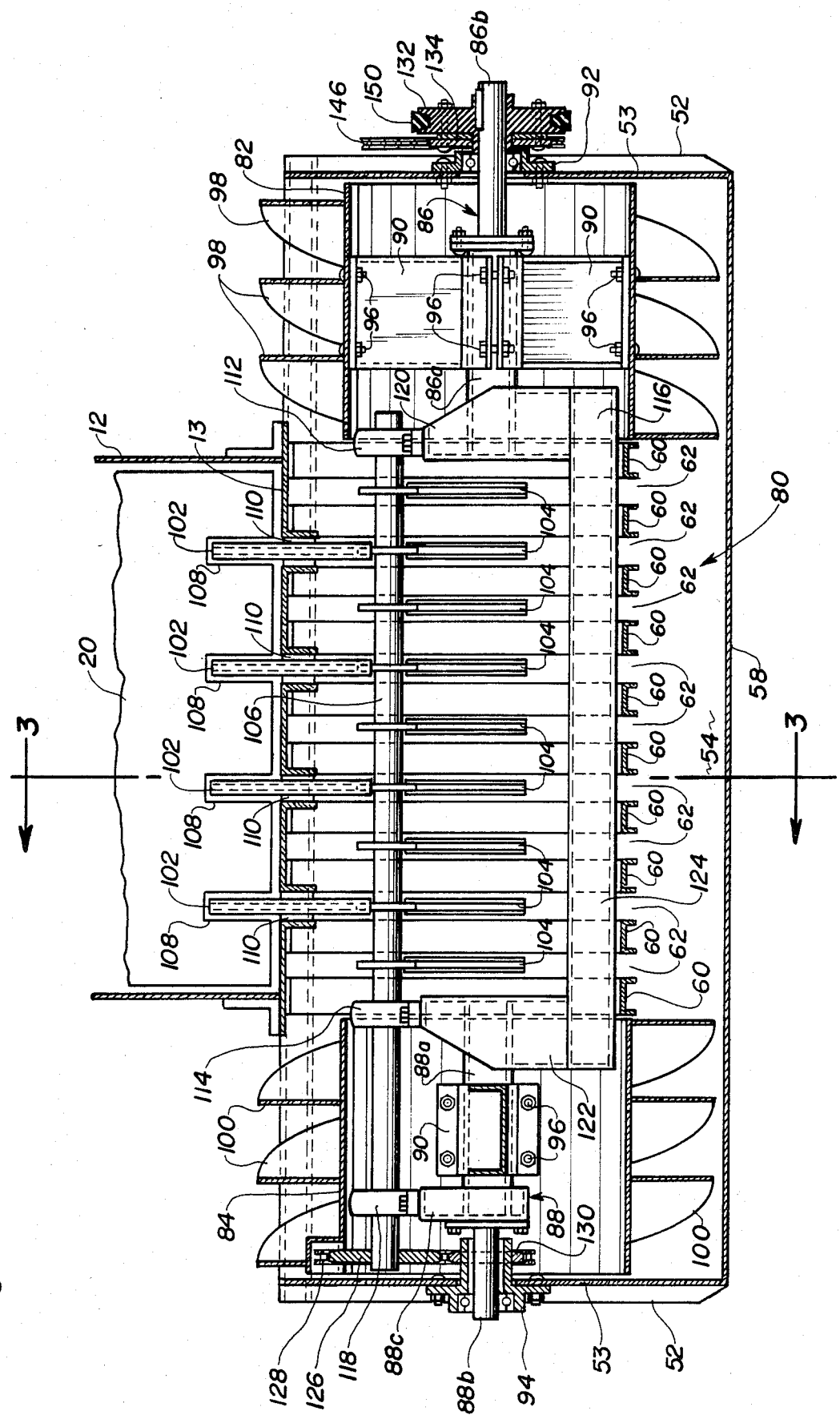
FIG. 2 is an enlarged sectional view taken along lines 2—2 in FIG. 1.

A feed chamber 52 is mounted underneath the base case 12 and includes a curved duct 54 having top and bottom walls 56 and 58, respectively, and sidewalls. As shown in FIG. 2, the top wall 56 is formed of a series of curved channel members 60, of inverted generally U-shaped cross-section, which are arranged side-by-side so that there are slots 62 defined between adjacent channel members 60. The bottom wall 58 is formed primarily of a single curved, continuous panel member 64 as seen in cross-section in FIG. 3. The curved duct 54 is open at its lower end 66 and at its upper end 68, and communicates at its upper end 68 with an inlet opening 70 formed in the bottom wall 13 of the bale case 12. A pickup device 72 of a conventional type is pivotally connected at 74 to the feed chamber 52 and is supported by wheels 76. The pickup device 72 includes a plurality of fingers 78 which are rotatable in the direction indicated in FIG. 1 for lifting crop material from the ground and delivering it toward the feed chamber 52.

A feeder mechanism 80 is provided in the feed chamber 52 for moving crop material toward the lower end 66 of the duct 54, then through the duct 54 from its lower end 66 to its upper end 68, and then into the bale case 12 through the inlet opening 70 in the bottom wall 13 thereof. Referring now to FIG. 2, it will be seen that the feeder mechanism 80 includes augers 82 and 84 mounted on beam portions 86a and 88a of shaft assemblies 86 and 88, respectively, by spider type brackets 90. These beam portions 86a, 88a are preferably of generally square cross-section and the brackets 90 are clamped thereto. Stub shaft portions 86b, 88b of the shaft assemblies 86, 88 are rotatably mounted in bearing members 92, 94 which are secured to the sidewalls 53 of the feed chamber 52. The beam portion 86a and the stub shaft portion 86b of the shaft assembly 86 are rigidly connected together. Likewise, the beam portion 88a and the stub shaft portion 88b of the shaft assembly 88 are also rigidly connected together. The brackets 90 are detachably connected to the augers 82,84 and to the shaft assemblies 86,88 by using conventional fasteners such as bolts 96 to permit removal of the augers 82,84 in sections, if desired, to facilitate servicing of the feeder mechanism 80. The augers 82,84 have the flighting 98,100 thereof arranged to move crop material from the outer regions of the feed chamber 52 inwardly toward the lower end 66 of the duct 54.

The feeder mechanism 80 also includes two sets of feeder elements or tines 102,104 fixed to a shaft 106 as best seen in FIG. 2 with the tines 102,104 arranged to project through the slots 62 in the top wall 56 of the duct 54. The tines 102 are preferably longer than the tines 104. Only the tines 102, and not the tines 104, will pass through slots 108 formed in the plunger 20 and through slots 110 formed in the bottom wall 13 of the bale case 12. Preferably, the number of tines 104 is about twice the number of tines 102. Alternatively, however, either the tines 104 located directly opposite the tines 102 or the tines 104 located between adjacent tines 102 may be eliminated. The shaft 106 is rotatably mounted in bearing blocks 112,114 which are secured to a substantially U-shaped frame 116. The shaft 106 is also rotatably mounted in a bearing block 118 which is secured to a hub portion 88c of the shaft assembly 88. The frame 116 includes two leg portions 120,122 which are rigidly connected such as by welding to the beam portions 86a,88a of the shaft assemblies 86,88. The frame 116 also includes a bight portion 124 extending between and rigidly connected at its ends to the leg portions 120,122. A sprocket 126 fixed to the shaft 106 is connected by a chain 128 to a sprocket 130 fixed on the bearing member 94. The sprocket 126 has twice as many teeth as the sprocket 130. During operation of the feeder mechanism 80, the sprocket 130 remains stationary but the sprocket 126 and the shaft 106 orbit about the sprocket 130 in one direction which causes the shaft 106 to rotate in the opposite direction in and relative to the bearing blocks 112,114,118. A sheave 132 is fixed to the stub shaft portion 86b of the shaft assembly 86, and a sprocket 134 is fixed to the sheave 132.

Referring now to FIG. 1, a sprocket 136 fixed to rotate with the sprocket 38 is connected to a sprocket 138 mounted on the side of the base case 12 by a chain 140 in a backwrap manner to cause rotation of the sprocket 138 in a counterclockwise direction as indicated. The chain 140 also extends around idlers 142. Another sprocket 144 fixed to rotate with the sprocket 138 is connected by a chain 146 to the sprocket 134 to cause counterclockwise rotation of the sprocket 134 and thus operation of the feeder mechanism 80. An idler 148 maintains tension in the chain 140. A belt 150 extends around the sheave 132 in a backwrap manner and around another sheave 152 on the pickup device 72 to rotate the sheave 152 in a clockwise direction and thus operate the pickup device 72. The belt 150 also extends around idlers 154, the forward one of which is preferably spring loaded to allow vertical movement of the pickup device 72 and to allow the belt 150 to slip if the pickup device is overloaded.

Referring to FIG. 3, it will be seen that the sets of tines 102 and 104 are mounted on the shaft 106 so that there is an obtuse angle of 157.5° between the leading edges 103 of the tines 102 and the leading edges 105 of the tines 104 when measured in a counterclockwise direction from the tines 102 to the tines 104. As the feeder mechanism 80 operates, the sets of tines 102,104 are each rotated in a counterclockwise direction about the axis extending longitudinally through the shaft assemblies 86,88 and simultaneously in a clockwise direction about the axis extending through the centers of the bearing blocks 112,114,118. This causes the outer ends of the tines 102 to follow a path of movement designated 162 and the outer ends of the tines 104 to follow a path of movement designated 164. These paths of movement 162,164 are offset relative to each other but they intersect at a point 163 located adjacent the lower end 66 of the duct 54. Only the path of movement 162 passes through the bale case 12. The paths of movement 162,164 are generally apple-shaped because the sprocket 126 driving the tines 102,104 orbits about the stationary sprocket 130 via the chain 128 and has twice as many teeth as the sprocket 130. For two complete revolutions as viewed in FIG. 3, i.e., 720° of rotation, of the sprocket 126 and the shaft 106 about the sprocket 130 in a counterclockwise direction, the sprocket 126 and the shaft 106 make one complete revolution, i.e., 360° of rotation, in a clockwise direction relative to the bearing blocks 112,114,118. The axis of the shaft 106 follows a path of movement 166 which is circular in shape. The center of rotation for the paths of movement 162,164,166 coincides with the axis extending longitudinally through the shaft assemblies 86,88. During the operation of the feeder mechanism 80, the frame 116 is also rotated and the weight of the bight portion 124 thereof serves to counterbalance the weight of the tines 102,104 and the weight of the shaft 106.

The operation of the feeder mechanism 80 is best understood from FIGS. 4–11. The plunger 20 is shown in FIG. 4 at the end of its rearward movement in the bale case 12, and the tines 104 are shown projecting into the duct 54 to pack crop material therein while the tines 102 are in an inoperative position. In FIG. 5, the plunger 20 is starting to move forward in the bale case 12 and the tines 104 are completing the packing of crop material into the duct 54 while the tines 102 are still in an inoperative position. The plunger 20 continues its forward movement in FIG. 6, and the tines 102 start to move into the lower end 66 of the duct 54 while the tines 104 are now located in an inoperative position. In FIG. 7, the plunger 20 continues to move forward and the tines 102 project into the duct 54 engaging the crop material previously packed therein by the tines 104 as well as any new material entering the duct 54. The plunger 20 completes its forward movement in FIG. 8, and the tines 102 continue to move through the duct 54 toward its upper end 68 thereby precompressing the material in the duct 54. In FIG. 9, the plunger 20 begins to move rearward in the bale case 12 and the tines 102 stuff material upwardly from the duct 54 into the bale case 12 through the inlet opening 70 in the bottom wall 13 thereof. As the plunger 20 moves rearward from the position shown in FIG. 9 to the position shown in FIG. 10, the tines 102 pass through the slots 108 in plunger 20 and through the slots 110 in the bottom wall 13 of the bale case 12. This combs off the tines 102 as they retract from the bale case 12. In FIG. 11, the plunger 20 continues its rearward movement to compress the material delivered to the bale case 12 into a bale, and the tines 104 start to pack new material into the duct 54 again.

It will be understood that in the preferred embodiment of the baler 10 disclosed herein, the feeder mechanism 80 is driven twice the speed of the plunger 20 which causes one packing stroke by the tines 104 and one stuffing stroke by the tines 102 for each complete stroke of the plunger 20. However, the baler 10 could be modified so that there would be, for example, two packing strokes by the tines 104 and two stuffing strokes by the tines 102 for each stroke of the plunger 20. This modification could be accomplished by simply increasing the length of the crank arm 24 which would thereby increase the length of the stroke of the plunger 20 and by driving the feeder mechanism 80 four times the speed of the plunger 20.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

Having thus described the invention, what is claimed is:

1. A baler comprising:
   (a) a bale case having an inlet opening formed therein;
   (b) a duct communicating at one end with said inlet opening in said bale case;
   (c) feed means including a first set of feeder elements arranged to pack crop material into said duct and a second set of feeder elements arranged to stuff crop material from said duct into said bale case through said inlet opening,
   (d) said first and second sets of feeder elements each being rotatable in one direction about one axis and in the opposite direction about another axis which is offset relative to said one axis; and
   (e) the feeder elements of said first set mounted on a shaft and having outer ends following a first path of movement and the feeder elements of said second set also mounted on said shaft and having outer ends following a second path of movement, and said first and second paths of movement being offset relative to each other so that only said second path of movement passes through said bale case.

2. The baler of claim 1, wherein the feeder elements of said second set are longer than the feeder elements of said first set.

3. The baler of claim 1 wherein said first and second sets of feeder elements are arranged so that there is an obtuse angle between the feeder elements of said first and second sets.

4. The baler of claim 1, wherein said first and second paths of movement are generally apple-shaped.

5. The baler of claim 2, wherein said first and second sets of feeder elements are arranged so that there is an obtuse angle between the feeder elements of said first and second sets.

6. The baler of claim 1, wherein said bale case has a bottom wall in which said inlet opening is formed, said duct has an upper end and a lower end, and said upper end of said duct communicates with said inlet opening in said bottom wall of said bale case.

7. The baler of claim 6, further comprising means located adjacent said lower end of said duct for picking up crop material from the ground and delivering it toward said feed means.

8. The baler of claim 6, further comprising augers disposed laterally of said duct for moving crop material toward said lower end of said duct.

9. The baler of claim 6, wherein said first and second paths of movement intersect at a point located adjacent said lower end of said duct.

10. The baler of claim 9, further comprising said shaft being rotatably mounted in bearings which are carried by a substantially U-shaped frame that is connected for rotation with said augers.

11. The baler of claim 10, wherein said U-shaped frame has a bight portion arranged to counterbalance said first and second sets of feeder elements and said shaft.

12. The baler of claim 1, further comprising a plunger disposed in said bale case, a rotatable crank arm connected to said plunger for causing reciprocation thereof in said bale case, said outer ends of the feeder elements of said first and second sets making one revolution around said first and second paths of movement while said crank arm makes one complete 360° revolution.

13. The baler of claim 1, wherein said second set of feeder elements also serves to precompress crop material in said duct.

* * * * *